United States Patent
Suzuki

[19]
[11] Patent Number: 6,129,274
[45] Date of Patent: Oct. 10, 2000

[54] SYSTEM AND METHOD FOR UPDATING SHOPPING TRANSACTION HISTORY USING ELECTRONIC PERSONAL DIGITAL SHOPPING ASSISTANT

[75] Inventor: Hikaru Suzuki, San Diego, Calif.

[73] Assignee: Fujitsu Limited, Japan

[21] Appl. No.: 09/094,323

[22] Filed: Jun. 9, 1998

[51] Int. Cl.[7] ............................................ G06F 7/08
[52] U.S. Cl. ........................... 235/381; 235/380; 705/16
[58] Field of Search ................................ 235/380, 379, 235/487, 492, 381, 383; 705/10, 14, 16, 17

[56] References Cited

U.S. PATENT DOCUMENTS

| | | | |
|---|---|---|---|
| 4,822,990 | 4/1989 | Tamada et al. | 235/492 |
| 4,833,607 | 5/1989 | Dethloff et al. | 364/401 |
| 4,965,802 | 10/1990 | Shinagawa | 371/51.1 |
| 5,380,991 | 1/1995 | Valencia et al. | 235/383 |
| 5,397,883 | 3/1995 | Miyashita | 235/382 |
| 5,559,313 | 9/1996 | Claus et al. | 235/380 |
| 5,566,327 | 10/1996 | Sehr | 395/600 |
| 5,572,653 | 11/1996 | DeTemple et al. | 395/501 |
| 5,574,269 | 11/1996 | Mori et al. | 235/380 |
| 5,590,038 | 12/1996 | Pitroda | 235/380 X |
| 5,665,951 | 9/1997 | Newman et al. | 235/375 |
| 5,857,079 | 1/1999 | Claus et al. | 235/380 X |

FOREIGN PATENT DOCUMENTS

| | | |
|---|---|---|
| 0 636 993 A1 | 2/1995 | European Pat. Off. |
| 0 786 746 A2 | 7/1997 | European Pat. Off. |
| WO 98/18094 | 4/1998 | WIPO |
| WO 98/38589 | 9/1998 | WIPO |

Primary Examiner—Karl D. Frech
Attorney, Agent, or Firm—Christie, Parker & Hale, LLP

[57] ABSTRACT

An electronic personal shopping system for communicating between a customer's personal memory store and point-of-sale terminals in a retail facility. Demographic profile data, a customer's transaction history data and a customer's current incentive indicia are stored in particular locations in a memory of a portable, machine-readable smart card. The smart card is adapted to interface with a store's check-out terminals and customer assistance, or kiosk terminals. Check-out terminals record a customer's most recent transactions in the customer's transaction history storage area and update a customer's current incentive indicia to reflect the most recent purchase. A customer is able to maintain a transaction history without intervention of a store platform computer. A customer assistance, or kiosk terminal, is able to develop promotional and personalized greeting messages by reading and analyzing the demographic profile, transaction history and incentive indicia information stored in the smart card to personalize the service offered to each individual customer.

32 Claims, 3 Drawing Sheets

SYSTEM AND METHOD FOR UPDATING SHOPPING TRANSACTION HISTORY USING ELECTRONIC PERSONAL DIGITAL SHOPPING ASSISTANT

FIELD OF THE INVENTION

The present invention relates generally to electronic systems for facilitating point-of-sale retail transactions and, more particularly, to a portable electronic IC card which captures transaction information in real time and which manages personal demographic and shopping history data for efficient pricing, promotions, and other personalized shopping assistance.

BACKGROUND OF THE INVENTION

Contemporary retail stores compete fiercely to establish and maintain the store loyalty of their present customers and to attract new customers to their stores. One mode of attraction is by offering personalized service which is adapted to meet the particular expectations and needs of each member of a highly diversified clientele. Matching service requirements to a particularized customer base, particularly in large department stores or stores with multiple facilities in many locations, requires the taking and maintaining of large amounts of data and processing of such data so as to compile a shopping profile of each customer.

Most modern retail stores implement some form of computerization or electronic technology in their operations. This typically consists of using point-of-sale (POS) systems for automating checkout procedures, assisting sales personnel, and the like. POS systems generally include one or more automated check-out terminals which are capable of sensing and interpreting a Universal Product Code (UPC) which is printed, or tagged, on each item of merchandise to be purchased. Conventionally, a POS terminal, a kiosk terminal or a salesperson's hand-held terminal is coupled to a computer system which recognizes and processes the UPC information. A database, accessible by the computer system, includes a list of merchandise items stocked by the store, a UPC for each of these items, and various types of merchandise identification information, including pricing, inventory, style, color, etc., associated with each UPC. When a customer is ready to make a purchase, a store clerk uses an automated POS terminal to read the UPC markings on each of the customer's selections. The computer interprets the UPC, accesses the database to determine the price for each item and maintains a running total of the purchase price.

Many stores also use computerized systems to convey pricing and other information about its merchandise to its customers and to acquire information about the kinds of merchandise purchased by a customer, frequencies of purchase the effect of advertising and in-store promotional activities, and other indicia of a customer's shopping habits. Retail stores use this information to control the costs of providing personalized services and products to its customers and to provide increased convenience and flexibility to the shopping experience.

An additional use of customer transaction information is to maintain a shopping history record of purchases by particular customers so as to award loyalty or incentive points to a customer based on their transactions. For example, incentive points might qualify a customer for participation in a discount program or some similar promotion, in a manner similar to airlines awarding frequent-flyer mileage points.

However acquired, and however used, customer data is conventionally captured during purchase transactions at one or more of a retail store's POS terminals. The data is transferred to a store's computer system where it is processed and appended to a particular customer's shopping transaction history. Incentive points are awarded, coupon codes are analyzed for applicability promotional items are evaluated, and the like, and an updated transaction record is provided to the POS terminal for immediate applicability to a customer's purchases.

However, such a system is most efficient in relatively small stores with a generally homogeneous merchandise inventory. Such stores may be efficiently serviced by a single central computer system which is able to maintain a reasonably sized database and process information with regard to only certain kinds of merchandise. One of the problems experienced by modern retail stores is that they might sell a wide variety of merchandise, in many departments, in a single facility. For example, department stores might sell groceries, clothing, tools, furniture, sporting goods, drugs and pharmaceuticals, etc., each organized into separate departments. Department stores tend to distribute their computer systems in a network configuration so as to have each of the separate departments serviced by a department server which maintains the merchandise database for each of the departments. Database updates, and customer transactions, are transferred between department servers and a store central computer on a periodic basis; database updates being downloaded from a store central computer and customer transactions being uploaded for processing. In order to make efficient use the processing power of the store central computer and the distributed databases, information transfer takes place as a batch process, on a periodic basis, with typically one to two hours elapsing between batch transfers.

For a chain of retail stores, each of the store central computers are likewise linked to a central processing facility which performs the same function for the stores as the store's central computer performs for the department servers. For example, the various databases of each store might be merely mirror images of the main database, such that a store's database may only be changed by modifying the central database.

In this particular implementation, information is again exchanged between each of the store's computer systems and the central processing facility in a batch process. Conventionally, batch processes are carried out during low-demand periods such as after the closing hours of some or all of the stores comprising the chain. Such batch process transfers typically occur only once a day.

The result of batch processing consumer transactions, either within a department store, or between stores in a chain, is that a particular customer's most recent transactions may not be accessible to a retail store's POS, or other in-store terminals because of the time lag between a customer transaction and the next scheduled batch process which updates each customer's file and makes that transaction history available to all of the other systems in the network.

These discontinuities in a customer's transaction history can result in the customer not receiving credit, for a period of time, for recently made transactions. If a customer were making multiple transactions in a department store or transactions at different stores in a chain, transactions made earlier in the day might not count for incentive award points which might result in the customer missing out on a particular promotional item offered at another store or in another department. For example, if the customer needed only an additional $100.00 transaction to qualify for a value coupon, and the customer made a $70.00 transaction in another department earlier, the customer would only need an additional $30.00 transaction to obtain the value coupon. Under the present, conventional method, a particular department might not have the information available as to the customer's prior purchase and thus, would be unable to award the coupon on a timely basis. There is no present method available for obtaining and tracking such information on a real time basis so as to maintain a particular customer's transaction history with complete accuracy at the moment of purchase.

Certain systems are available in the prior art for capturing and maintaining certain kinds of information relating to store merchandise and/or customer transactions. Each of these methods, however, are very specific as to the type of information captured and the uses to which the information is put.

U.S. Pat. No. 5,566,327 discloses a computerized information system for theme parks which utilizes a smart card, provided to a visitor as a guest pass, to record information relating to the theme park's products and services. The guest pass controls and monitors admission to the park and functions as a smart debit card with which a guest is able to prepay for various goods and services offered at various point-of-sale locations throughout the park. The smart guest card is able to identify the rightful cardholder and also guarantee the eligibility of the particular guest to receive the appropriate services and/or products that have been paid for and written into a memory store of the guest card. The guest card is implemented as a pocket-sized computer that has a shape similar to plastic bankcards but include silicon chips and software embedded into the card package. However, the system is difficult to implement as a real-time transaction history acquisition and maintenance system, because the smart guest pass is adapted to function as a debit system. The park's products and services are initially evaluated by a guest and certain items are contracted for and prepaid. These items are entered into the guest pass and, as received, decremented from the guest pass by means of a conventional cash-less payment methodology.

U.S. Pat. No. 5,665,951 discloses an electronic system which assists a customer in making a purchase transaction by providing compatibility information relating to recent, similar transactions made by the customer. The system includes an IC or smart card which is able to store indicia identifying selected characteristics of items which are currently owned by the customer, such as clothing color, styling parameters and metric information. A particular disadvantage to the system disclosed in the '951 patent is that it is only useful for determining compatibility between selected items and currently-owned items. In particular, the system of the '951 patent requires that each contemplated item and each currently-owned item be identified by suitable compatibility information so that the system can make an accurate comparison and compatibility determination.

Accordingly, there exists a need for an electronic, computerized system that is able to collect and store customer transaction history information in real-time and make that information available to a department store or chain store POS, or other in-store terminal, such that a customer's transaction history data is always up-to-date. Such a system should be easily portable by a customer and easily accessible to a POS, or other in-store terminal so that transaction history information may be read therefrom and/or written thereto at the instant a transaction is consummated.

SUMMARY OF THE INVENTION

These and other objects are accomplished in accordance with the present invention by an electronic personal shopping system which allows a shopper a convenient and portable means of maintaining an up-to-date shopping transaction history record of all of that customer's most recent purchases without requiring intervention of a store platform computer. Current customer data, both demographic and transactional, is maintained on a personal memory store. The electronic personal shopping system is able to interface with a customer's personal memory store and is able to edit and update the information contained thereon to maintain it in an up-to-date fashion and is also able to offer suggestions on promotional items and items that the customer may need to replenish based on information contained in the personal memory store.

In accordance with one aspect of the invention, the electronic personal shopping system includes a portable, machine-readable personal memory store, such as a smart card or IC card, which includes a number of non-volatile data storage areas which are partitioned into information specific areas. One data storage area partition contains customer specific demographic information, including information related to that customer's identity and status, and also including information relating to a customer's brand preferences and personal preference metrics, such as clothing size, colors, patterns, style and the like.

The personal memory store is further partitioned into an area containing information identifying a customer's transaction history and an additional are containing information relating to a customer's current loyalty or incentive indicia totals. The transaction history information is organized as a data table having a plurality of sequential entries, with each entry holding at least an item name and an item price of each item recently purchased by a customer. The transaction history information data table is cyclically maintained, such that when the table is completely filled with entries, the next entry, defining the customer's most recent purchase, is written over the oldest entry in the table.

The portable machine-readable personal memory store is used in conjunction with at least a point-of-sale check-out type terminal which includes a personal memory store interface unit capable of reading, writing and editing demographic profile, transaction history and incentive indicia information of a personal memory store. The terminal further includes an output device and a microprocessor based control unit coupled between the interface unit and the output device. The microprocessor based control unit manages information transfer and data processing under application software program control and includes issue circuitry for creating the data storage area partitions on the personal memory store and entering customer specific demographic profile information into the partitioned areas. The microprocessor based control unit further includes transaction circuitry by which it may edit and update transaction history data and current incentive indicia data to reflect a customer's most recent transactions the transaction circuitry further includes means for determining whether a particular customer's most recent transactions qualify that customer for an incentive award.

In a further aspect of the present invention, the portable, machine-readable personal memory store is used in conjunction with a customer assistance, or kiosk, terminal which is able to develop and display various personalized assistance recommendations to a customer based on an analysis of demographic profile, transaction history and current incentive indicia data read from a customer's personal memory store. The customer assistance terminal is microprocessor based and includes means for processing a customer's demographic profile data in order to develop personalized greeting messages which are displayed in conjunction with other promotional recommendations. Demographic profile data is also processed to develop promotional recommendations based on a customer's noted brand and other personal preferences, a customer's family status, i.e., children's promotions, and promotions based on a customer's particular demographics, i.e., senior citizen.

The customer assistance terminal is also able to process a customer's transaction history information to thereby develop a promotional item recommendation based on a customer's recent transactions, such as replenishment item recommendations and recommendations for particular co-ordinated items that match an item recently purchased. In addition, the customer assistance terminal is able to determine that a particular customer has not made any purchases of items falling within particular categories and is able to generate a promotional item message directed to that customer in order to remedy the deficiency.

In yet another aspect of the present invention, the portable machine-readable personal memory store comprises either a contact-type or contactless-type smart card configured to interface with the interface unit of either the check-out type terminal or the customer assistance terminal. In either the contact-type or contactless-type configuration, the smart card includes at least a non-volatile integrated circuit memory element defining the non-volatile data storage areas into which customer information is written. The smart card further includes an integrated circuit processor for managing data information transfer between the memory element and a terminal interface unit. In a contactless-type configuration, the smart card includes an RF transceiver circuit and the terminal interface unit is constructed to enter into wireless bi-directional communication with the transceiver circuit so as to read and write information from and to the memory element.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Figure 1:
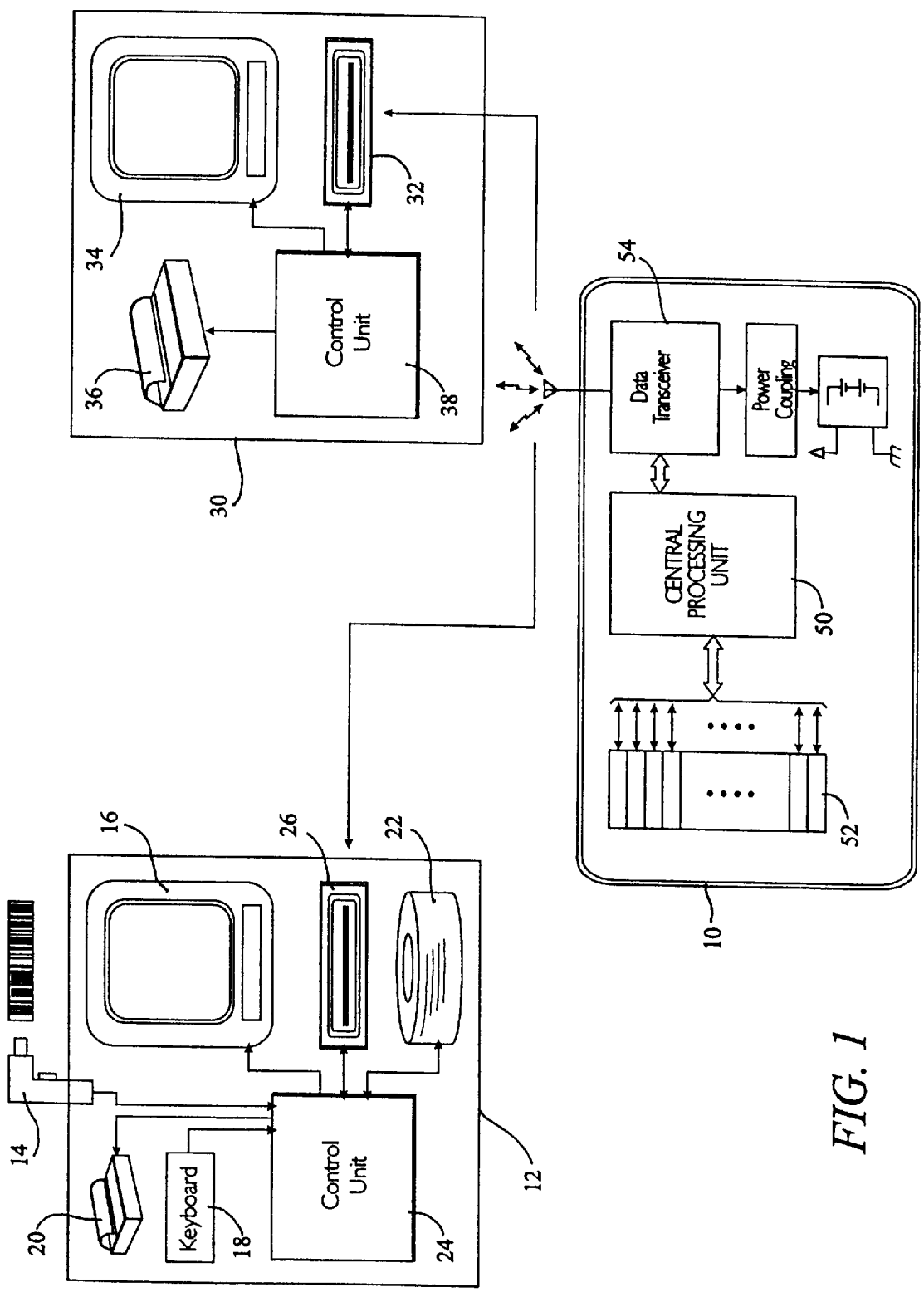
FIG. 1 is a semi-schematic block diagram of a personal digital shopping assistant including a customer identification IC card in accordance with the present invention.

In general terms, the present invention provides a particular system and method by which a particular customer of a retail store, such as a department store, supermarket, chain store, or the like, is able to use in order to store and maintain current shopping transaction history information as well as pertinent data relating to the customer's identification and demographic profile. Demographic profile information such as a customer's family status, age, gender, and various personal merchandise preferences such as merchandise color, clothing style, a customer's hair, eye and skin color, preferred trade or brand names, and the like, are all particularly useful to a retail facility in determining what types of promotional items might be presented to this particular customer on the basis of their demographic profile. In addition, various items of merchandise being considered for purchase might be compared to previously purchased items and to a customer's physical characteristics in order to provide a basis for deciding whether or not the considered item would appropriately match the, for example, color and style characteristics of a previously purchased Item.

In addition, system and method according to the invention allows a transaction history to be stored and maintained in real-time, thus making a customer's most recent transaction data available to a retail store for the purpose of computing loyalty or incentive points based on a running total of a particular customer's purchases, allocation of in-store promotional coupons, and the like. The system and method according to the invention provides a customer with a convenient, transportable means for conveying accurate shopping transaction data from point-to-point in a multi-department retail store or between stores in a chain store. Access to real-time customer transaction information allows a retail facility to use a customer's latest transaction information for promotional purposes and/or providing prompt, effective personalized recommendation services to a customer considering a transaction.

For in-store shopping, the system and method according to the invention provides for the storage of a customer's personal information, demographic profile and shopping transaction history data in a convenient and readily transportable form, such as a credit card shaped, smart card-like customer ID card which a customer is able to use to interface with various in-store POS or hand-held terminals when making a purchase transaction. In the most general case, a customer might bring a number of items to a cashier or check-out station, at which a POS terminal is configured to read and record each item's SKU number (Stock Keeping Unit), determine the sales price for each item so scanned, and deliver an invoice or receipt for all of the items the customer desires to purchase, typically by creating a hardcopy record on a printer. Just prior to initiating the transaction, the customer's ID card is inserted into an appropriate ID card interface unit which is able to access the information stored on the card for use by the POS terminal during the transaction. Customer identification information is pertinent to the determination of an award of incentive or loyalty points, as is a particular customer's transaction history data.

At the POS terminal, once a transaction is completed, the transaction data, including the name and other identification information for each item, the price for each item and any other information which is pertinent to a retail store's promotional considerations, is entered into a shopping transaction history file included in the customer's ID card. The item identification information includes, at least, an item's SKU number or some other such identification indicia that a store's sales personnel might use at some later time to fully identify a merchandise item by its various characteristics. Once this latest shopping transaction is entered into a customer's ID card, the customer may visit other departments in a multi-department store or may visit other stores in a chain and use their ID card to make other, additional transactions. If a customer is visiting multiple stores or multiple departments within a store during the time period between batch processes, the store is able to evaluate that customer's immediate transaction history information in order to allocate loyalty or incentive points, award in-store coupons, and the like, all by merely reading and writing information from and to the ID card at a POS terminal.

Similarly, a customer might use the ID card to access various in-store kiosk terminals in order to gather information about various items that he or she might desire to purchase, as well as effect various purchase transactions. A retail store might provide a kiosk terminal in, for example, a clothing department which is able to access, from a department server, for example, information relating to that particular department's merchandise inventory. A customer might insert the ID card into an ID card reader/writer unit provided at the kiosk terminal, and access the kiosk terminal's merchandise inventory database in order to select items for purchase. As a customer selects various items for purchase, the kiosk terminal is able to write the information regarding that merchandise item to the customer's ID card. The kiosk terminal is also able to access stored incentive or loyalty point information stored on the card and calculate instant discounts if, for example, the customer's incentive or loyalty point total has exceeded a particular threshold value. Moreover, the kiosk terminal is able to read the customer's demographic profile information contained on the ID card and is able to adjust prices and services based on the information contained therein. In particular, if the customer is able to qualify for a senior citizen discount, the kiosk terminal is able to determine this by accessing the age metric of the customer's demographic profile information. If this shows that the customer is over the age of, for example, 65, a senior citizen discount is automatically applied to the purchase price of the various items selected for the transaction.

Once the customer selects particular items for purchase, the kiosk updates the customer's transaction history information with a record of the recently purchased items which may then be used by the customer in connection with subsequent shopping activities. Kiosk terminals are of particularly advantageous means for presenting a customer with information regarding promotional items, particularly in connection with the customer's personal demographic profile information contained on their ID card. The kiosk terminal can read the profile data and evaluate a customer's accumulated, incentive or loyalty point totals and make particular recommendations regarding promotional items for its particular department that the customer might be interested in. For example, if the kiosk terminal were provided in a clothing department, and the customer had recently made a purchase of a dress, the kiosk terminal would be able to access this purchase transaction information and might suggest that the customer might be interested in a new pair of shoes in a color and style compatible with the dress. Depending on the customer's incentive or loyalty point totals, the new pair of shoes might be offered at a discounted price as a customer loyalty award.

Additionally, storing and maintaining shopping transaction history information on an ID card might allow a customer to shop without the necessity of carrying their purchases with them as they move from department to department within a store. A record of each desired purchase is maintained on the ID card and when a customer is ready to terminate his or her shopping excursion and either pick up their merchandise or have their merchandise delivered, they need only present the ID card at a cashier station equipped with a POS terminal to complete the transaction. The POS terminal is able to read the transaction history information total-up the purchase price and compile a list of the SKU numbers of the purchased items for transmission to the stock room or merchandise warehouse, where the merchandise item list is compiled, the items pulled from the stock shelves and collected either for customer pick up or for delivery to a customer specified location. This is a particularly advantageous feature when a customer is planning an extended shopping trip to purchase either a large number of items or a few items of a significant size and/or weight. The ability to move through departments in a department store or from store to store in a chain, without having to carry their purchases with them is a significant improvement in customer convenience and shopping efficiency.

It will be appreciated that a retail store equipped with the system and method of the present invention, is able to provide a significantly enhanced degree of personalized service to customers that make their purchase transactions using such an ID card. Customer loyalty is promoted and enhanced by providing an effective means for immediately allocating incentive award points, store coupons, and the like, upon a purchase without having to wait until the next batch process upload in order to update a particular customer's transaction history information. In addition, such a system and method provides for effective, real-time collection of recent purchase data so that promotional recommendations and compatibility evaluations can be performed with respect to purchase decisions contemplated during subsequent shopping activities.

Considering the foregoing summary of the features of the system and method of the present invention, FIG. 1 depicts a simplified, semi-schematic block diagram of an exemplary embodiment of such a system for updating and maintaining a customer shopping transaction history including a personalized digital shopping assistant. In the exemplary embodiment of FIG. 1, the personal digital shopping assistant 10 is configured as a smart card-like customer membership or ID card, preferably comprising an IC card which manages a customer's personal information and shopping history and which provides in-store promotional and shopping assistance for each particular customer. As a retail store issues a membership IC card to each particular customer, that customer's personal demographic information, shopping history and store incentive program information is stored, in a manner to be described in greater detail below, in particular memory locations allocated to such information in a memory store provided on the IC card. Using the IC card 10, a customer is able to move from department to department within a multi-department store, or from store to store in a chain, and maintain an accurate up-to-date transaction history record and is able to interact with various electronic systems within a store, or between stores, in order to effect additional purchases.

For in-store shopping, the IC card 10 provides shopping transaction history data and a customer's demographic information in a convenient and readily transportable form, which the customer may use at various point-of-sale terminals or information display stations throughout the store in order to effect a purchase. When making a purchase, a customer might bring an item to an in-store POS terminal 12 and present his or her IC card 10 for recording the purchase. The POS terminal 12 is conventionally provided with suitable means for sensing and interpreting a universal product code (UPC) that is associated with each merchandise item, such as a bar code scanner 14. The POS terminal 12 further comprises a system display screen 16 such as a VGA or SVGA liquid crystal display (LCD), a keyboard 18 for manually entering data and other information, and a printer 20 for printing out sales receipts, discount coupons and other forms of hard copy information associated with purchase transactions. The POS terminal 12 additionally comprises a mass storage unit 22 which provides for a measure of local data storage which a POS system is able to immediately access without having to arbitrate for connection to a network or transact with a network server. The foregoing peripheral devices are coupled to a control unit 24 which is configured to control the operation of the POS terminal system and to effect communication with other store terminals, a department network server, or a store's central computer system over a network configuration. The control unit 24 is further coupled to an IC card interface unit 26 which is preferably configured as an IC card reader/writer unit, able to read information from and write information to a customer IC card 10 under command of the control unit 24.

In addition to a POS terminal 12, the customer IC card 10 is able to interface with stand-alone, in-store terminals 30 such as a kiosk terminal, a salespersons' hand-held terminal or a personal shopping system terminal of the type described in co-pending application entitled Electronic Shopping System Including Customer Relocation Recognition, commonly owned by the Assignee of the present invention, the entire disclosure of which is expressly incorporated herein by reference. The stand-alone terminal 30 includes an IC card interface circuit 32, configured to read information from and write information to a customer's IC card 10. The stand-alone terminal 30 further comprises one or more output devices such as a video display screen 34 or an optional printer unit 36, all coupled to a corresponding control unit 38 which controls operation of the stand-alone terminal 30. If the stand-alone terminal is configured as a salespersons' hand-held terminal, it is configured to include a bar code scanner for reading SKU numbers from various merchandise items and might optionally also include a serial port for connecting a keyboard and/or some form of mass storage unit such as a hard disk drive or floppy disk.

The exemplary system depicted in FIG. 1 is not limited to the terminal types illustrated or the particular configurations described in connection with each terminal type. It will be understood by those having skill in the art that several terminal types are eminently suitable for use in connection with the system and method of the present invention. The POS terminal 12 and the stand-alone, in-store terminal 30 are shown merely as point-of-service apparatus and represent any number of such terminals and terminal types that might be implemented by a retail store. The terminals may be either configured as thin clients in a client-server network environment or as satellite systems comprising a mainframe-based system. Links between terminals and a store computer system, or distributed network server, as well as links between local system components are able to be implemented by any commercially available communication technology, such as 10/100BASE-T LAN technology.

The personal digital assistant 10 is preferably configured as a smart card-like IC card, which provides a suitable means for a customer to transport pertinent data between terminal locations in a retail facility and exchange that pertinent data with the facility through the use of the various IC interface units provided therewith. While referred to as an IC card, the customer card 10 comprises a personal memory card or data card which looks and feels much like an ordinary credit card. The IC card might be either contact based or contactless and might, in its simplest form, be a contact-type magnetic tape card which comprises a magnetic tape storage stripe affixed in a particular location on the card's surface. Preferably, the card is configured as a contactless IC card, which suitably comprises a central processing unit (CPU) 50, such as a microprocessor, in combination with a memory store 52 such as an electrically erasable field-programmable read-only memory (EEPROM), or a flash ROM (FROM). The card further includes an input/output interface circuit 54 by means of which information is read to and written from the memory store 52 under software or firmware program control of the microprocessor 50. The I/O interface circuit 54 might comprise circuitry for inductively or capacitively transferring data signals between the card and an IC card interface unit if the card is provided in a contactless or wireless configuration. In an alternative configuration, the I/O interface circuitry 54 might suitably comprise printed contact terminals if the card is provided in a contact technology configuration. Because contact terminals are rather delicate and subject to wear and breakage, a contactless configuration is preferred.

As was mentioned above, the IC card 10 includes a microprocessor 50 and a memory store 52 for storing customer demographic information and transaction history data and, in a contactless configuration, might also include circuitry for inductively receiving a power signal and capacitively transferring data between the card and a corresponding IC card reader/writer unit comprising the terminal portion of the system.

Figures 2, 3:
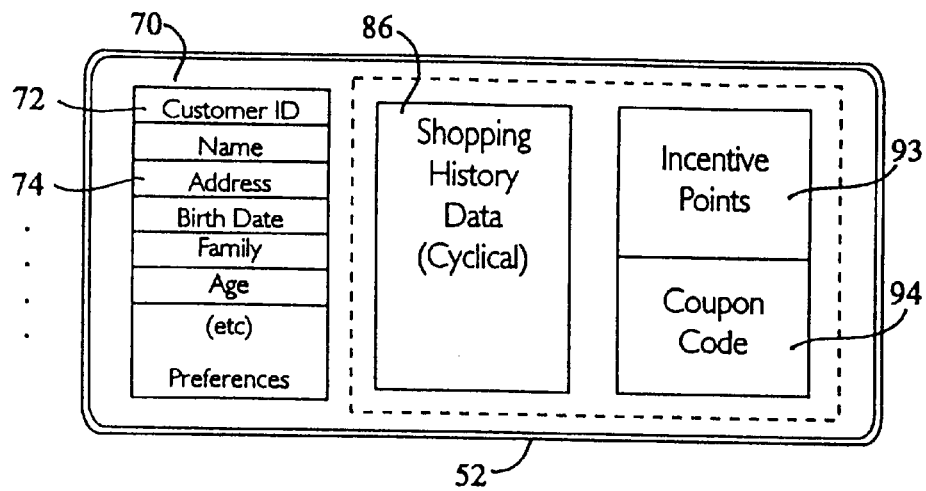
FIG. 2 is an exemplary semi-schematic block diagram of the information storage layout of the customer identification IC card of FIG. 1.
FIG. 3 is a conceptual layout diagram detailing the organization of a shopping history in accordance with practice of the present invention.

Having reference now to FIG. 2, there is depicted a conceptual diagram of the information storage layout of an exemplary IC card useful in practice of the present invention. A first, generally fixed, static information storage area 70 that typically comprises a customer ID field which is used by a retail facility to uniquely identify particular transactions to specific customers. In addition to the customer ID field, the static information storage area 70 includes an allocated space which contains general demographic information relating to the specific customer. Such general demographic information typically includes a customer's name 72, a customer's address 74, a customer's telephone number 76, a customer's date-of-birth 78, a card classification metric 80 (gold card, superclub member, and the like) and card issue date 82. These general information records are common to nearly all conventional IC card types. Their record lengths and structure are generally known beforehand and, while their order might vary from application-to-application, their content is generally fixed. Additional semi-fixed space is allocated in the static information storage area 70, for a customer's demographic profile information. This information is termed semi-fixed because unlike a customer's name, home address and the like, a customer's demographic profile is much more likely to vary with time. Demographic profile information might include a customer's family status, i.e., married or single, a customer's gender, age, the size of a customer's family including the ages and genders of any children, and the like. Demographic profile information would also include a customer's merchandise brand preferences as well as personal preference information relating to clothing sizes, colors and/or patterns.

The static information storage area 70 is termed generally fixed or semi-fixed, because most of the information contained therein does not radically change over time. However, it will be evident to those having skill in the art, that each of the allocated areas are able to be modified in the event that a customer's demographic or profile information should change, i.e., through marriage, an addition to the family, a move to a new address, and the like. The static information storage area 70 is termed generally fixed or semi-fixed, only in comparison with the generally variable character of the remaining allocated areas of the memory store 52 of the IC card as will be described in greater detail below.

A second, generally variable shopping history storage area 86 is also allocated to the memory store of the IC card, and comprises a recirculating information storage area into which a sequential shopping history list is written which contains a transaction history of the latest items purchased at the store. Because of the need to efficiently allocate the limited amount of storage capacity available to a memory store of an IC card, the space allocated for the shopping history storage area 86 is sequentially and cyclically written such that once all of the entry spaces are filled, the next transaction entry is overwritten on the oldest shopping transaction record entry. Thus, the shopping history 86 is being constantly updated to reflect a customer's most recent shopping transactions. An up-to-date audit record of a customer's transaction history is accessible by merely interrogating and reviewing the shopping history storage area 86 of the IC card.

An illustrated embodiment of the format of a customer shopping history is depicted, in conceptual form, in FIG. 3. The format of the exemplary shopping history 86 is best understood as comprising a sequence of lists, with each list being headed by a date of purchase entry 88 and a total purchase amount entry 89. For each date of purchase, the list suitably comprises an item description 90 which would advantageously include an item's SKU code, an item's trade name or brand name, an item's generic name and an item's weights and measures metric.

In addition to the item description field 90, an item quantity field 91 provides an area for listing the quantity purchased of the items identified in the item description field 90 by either identifying the number of items purchased, the weight of the items, along with an indication of unit-of-measure, i.e., pounds, pints, and the like. The price associated with each item purchased is listed in a corresponding price field 92 associated with each item description field 90. The item description, item quantity and price fields are sequentially repeated and filled out for each of the items purchased during a particular shopping trip on the particular date of purchase.

Returning now to FIG. 2, the exemplary IC card further comprises additional generally variable storage areas which are used to record and maintain information relating to, for example, incentive or loyalty point awards, i.e., incentive point storage area 93, and to store any coupon codes that might have been awarded to a customer in a coupon code storage area 94. It will be evident that additional storage areas might be defined in the IC card's memory store 52 for recording and maintaining many different types of information relating to a customer's transactional preferences and information that may be of use to a retail store in analyzing customer preferences, the effects of advertising, customer density in various departments at various periods of time, and the like. The particular storage areas and their layout depicted in FIG. 2 should therefore be viewed as exemplary and are in no way intended as limiting the scope of the present invention.

Figure 4:
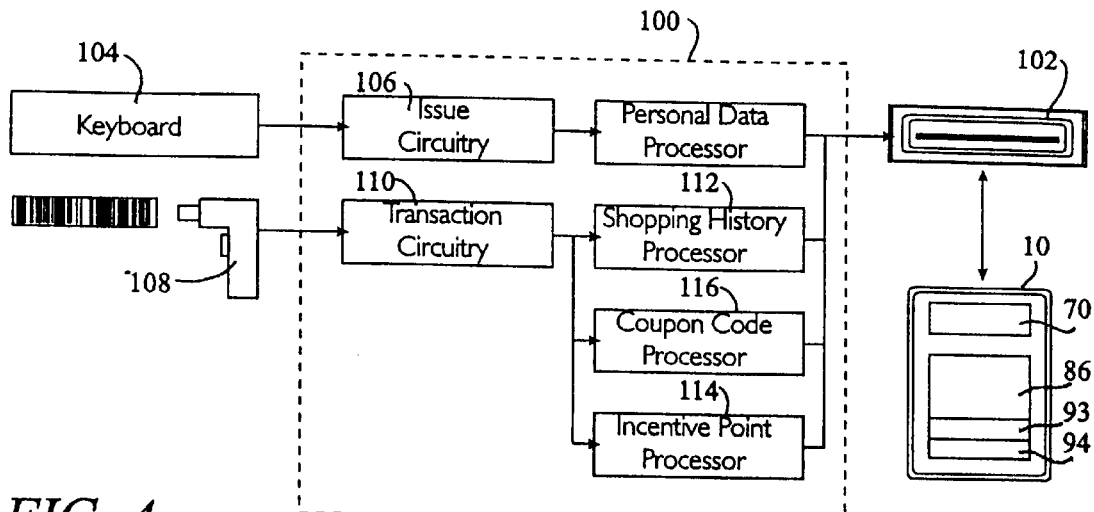
FIG. 4 is a semi-schematic block diagram of exemplary interface circuitry for reading, storing and updating shopping history and incentive information in accordance with the present invention.

In operation, a customer embarks on a shopping excursion taking along the IC card 10 which contains a transaction history record of the latest purchases made at that particular store, along with a running total of any incentive or loyalty point awards or coupon codes that have been allocated to that particular customer by the store. As a customer shops and makes purchase decisions, the customer interfaces the IC card 10 to any one of a variety of terminal types provided by the store to effect purchase transactions. The terminal, as explained above, accesses the customer's personal information in order to validate the transaction and in order to ensure that the appropriate data is matched to the appropriate customer when satellite transactions are uploaded to a central computer system during a batch process at some later time. Turning now to FIG. 4, there is depicted a semi-schematic block diagram of exemplary interface circuitry for reading, storing and updating shopping history and incentive information useful in practice of the present invention. In FIG. 4, a retail store terminal is generally indicated at 100 and includes an IC card interface circuit 102 adapted to read information from and write information to an IC card 10. When the IC card is issued, the information fields comprising the static information storage area 70 of the IC card are filled with a customer's general demographic information by entering that information on a keyboard input unit 104. The customer's personal demographic information is processed by membership card issue circuitry 106 operating under software or firmware program control. Issuing a membership IC card is contemplated as comprising a separate operation from using the IC card to effect a sales transaction. This is because the information written to an IC card during the issue process is intended to be generally fixed and additionally includes information such as card type and issue date which are under the control of the retail store rather than the customer. It is desirable that the information contained in the generally fixed static information storage area 70 be accessible only under certain circumstances and only through certain "membership card issue capable" terminals in a store. Once the personal information is entered into the system, the IC card interface circuitry 102 writes the information to the appropriate static information storage area 70 of the IC card 10. The card has now been validly issued.

Following issue, the card may be used to effect sales transactions and to acquire incentive or loyalty points and to have coupon codes allocated thereto at the discretion of the store. If the card is being used to effect such a sales transaction, the generalized terminal 100 typically reads information about the articles being purchased by scanning an article's UPC code with a barcode reader input device 108. As an item is scanned, the information relating to that item is processed through sales transaction circuitry 110 operating under its own software or firmware program control. The sales transaction circuitry 110 suitably includes shopping history processing circuitry 112 which evaluates the item information scanned by the barcode reader input 108 and suitably processes the article's identification information and writes the transaction to the shopping history storage are 86 of the IC card. This process is sequentially carried out until there are no more items to be purchased, no more items remaining to be scanned and no more items remaining to be entered into the shopping history storage area of the card. Incentive or loyalty points are evaluated and awarded by incentive point processing circuitry 114. The incentive point processing circuitry evaluates the items being purchased and the price paid for each item as well as the total purchase price of the entire transaction. Based on the price metric, the incentive point processing circuitry might award incentive or loyalty points based on a percentage of the total purchase price, the identity of particular items purchased, or some other such metric at the discretion of the store. Once incentive or loyalty points are calculated, the terminal adds the newly awarded incentive or loyalty points to the incentive or loyalty point total contained in the appropriate storage area 93 of the IC card. The IC card interface circuit 102 updates the incentive point storage area 93 of the IC card to reflect the newly calculated incentive or loyalty point totals amassed by the customer during this most recent transaction.

Coupon code processing circuitry 116 evaluates the items that have been scanned by the barcode reader input 108 to determine whether to allocate any coupon codes to the customer for purchasing a particular item. For example, if the customer were to purchase a suit, the store might desire to award coupons good for the purchase of certain accessories such as belts, ties, cufflinks and the like. Coupon code processing circuitry evaluates whether or not any coupons should be allocated to the customer and, if so, the IC card interface circuitry 102 appends the newly awarded coupon codes to the coupon code storage area 94 of the customer's IC card 10 for use by the customer during subsequent shopping visits.

Figure 5:
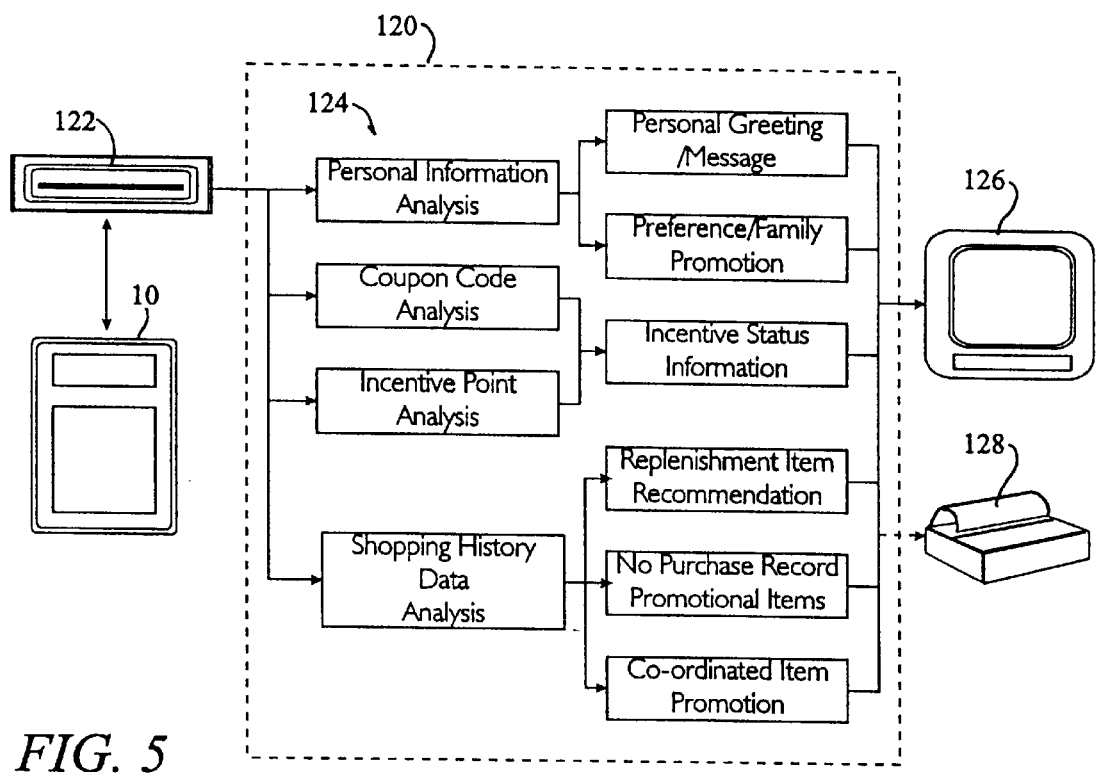
FIG. 5 is a schematic flow chart depicting operation of the interface circuitry of FIG. 4.

In addition to be useful to effect transactions, the system and method of the present invention is equally useful in obtaining personalized shopping assistance when a customer's IC card 10 is interfaced with a, for example, kiosk terminal, a salesperson's hand-held terminal or a personal shopping system terminal. Turning now to FIG. 5, there is depicted a generalized schematic flow chart illustrating the various functions that are able to be performed by a, for example, kiosk terminal, indicated generally at 120, in combination with a customer's IC card 10 in accordance with practice of the present invention. The kiosk terminal 120 suitably includes an IC card interface unit 122 which is able to access the information provided in the memory store of the IC card and forward any information extracted therefrom to processing circuitry 124 which analyzes the information to provide a customer with personalized shopping assistance.

For example, the processing circuitry is able to read a customer's personal information and might access the customer name field in order to provide an appropriate personalized greeting to the customer over an output device such as an LCD display unit 126 or a (optional) printer 128. In addition, the processing circuitry might access a customer's date of birth in order to display a personal greeting such as, "Happy birthday Mr. John Smith". Personal information processing might well include accessing a customer's family information records which would be complied against a list of various in-store promotional items in order to determine if any of the promotional items might be suitable for recommendation to the customer. For example, if it is determined that the customer has a family which includes small children and there are promotional items available in the children's clothing department, the kiosk terminal is able to convey such information to the customer by displaying an appropriate message on the display screen 126.

In addition, the processing circuitry is able to process coupon code and incentive or loyalty point information read from the IC card by the IC card interface circuitry 122 and is able to prepare and display incentive messages to the customer based on the incentive information obtained from the IC card. For example, such an incentive message might read, "You have 970 incentive points. You will become a Gold Member with an additional $30.00 purchase!". Similarly, the processing circuitry might suitably display a message reading, "You have $50.00 in value coupons. Push enter to display a list of items which you can purchase using these coupons.". Thus, the kiosk terminal 120 is able to adaptively prepare and display several personalized greeting and promotional messages to the customer which are specifically directed to that customer based on the customer's personal information, preferences, and incentive information.

The kiosk terminal 120 is further able to process a customer shopping history information which has been read from the customer's IC card by the IC card interface circuitry 122. From a customer's shopping history information, the processing circuitry 124 is able to make purchase recommendations for replenishment items by analyzing the last purchase date of a necessity item from the shopping history. For example, in a supermarket environment, the kiosk terminal might determine that a substantial period had past since the customer last purchased necessities such as milk, butter, eggs, and the like. Accordingly, the kiosk terminal would display a replenishment item recommendation list to the customer. In addition, the terminal's processing circuitry 124 is able to determine that there might be no shopping history record for certain items of a customer's IC card, indicating that the customer does not purchase those items at that particular store. In that case, the terminal might well be programmed to offer those items to the customer on a promotional basis in order to entice the customer to purchase those items at that store. Likewise, the processing circuitry 124 is able to make compatible, coordinate item recommendations to a customer based on the customer's prior purchase transaction history. In this case, the processing circuitry 124 might determine that the customer has recently purchased a green dress by recognizing that particular merchandise item's SKU number in the customer's shopping history file. Upon determining the customer's recent purchase, the processing circuitry 124 is able to access its list of promotional items and recommend a promotional item that would coordinate well with the recently purchased dress. For example, the processing circuitry might determine that shoes, belts or earrings might be found in the promotional item list and is able to recommend those promotional items to the customer as coordinating with the dress.

The kiosk terminal 120 in combination with the customer's IC card 10, in accordance with the invention, is thus able to provide personalized shopping assistance and make targeted promotional recommendations to a specific customer based on that customer's personal preference information and unique transaction behavior. The system and method according to the invention is able to update a customer's transaction information at the point of sale, making it available for subsequent purchasing activity with no consequent delay. In addition, the system is able to take advantage of the latest customer transaction information in order to provide personalized promotional and service recommendations to the customer. Implementing such a system is relatively simple because the individual terminals comprising such a system can be configured to be independent of a host computer, thus freeing up the host computer for mainline data processing tasks.

It will be understood that the foregoing is merely illustrative of practice of principles of the invention and that various modifications can be made by those skilled in the art without departing from the spirit and scope of the invention. Other applications to IC cards, point-of-sale terminals or other information processing systems are contemplated as being within the knowledge of one skilled in the art may be utilized to significantly enhance personalization of services rendered by a store.

What is claimed is:

1. An electronic personal shopping system for use in a retail facility, the system comprising:
   a portable machine-readable personal memory store including a plurality of non-volatile data storage areas, the data storage areas partitioned to define a first portion containing customer specific demographic profile information, the personal memory store further partitioned to define a second portion containing information identifying a customer's transaction history and at least a third portion for storing a current incentive indicia, wherein the transaction history includes information on each item most recently purchased by the customer;

at least a point-of-sale terminal, the terminal including;

a personal memory store interface unit capable of reading, writing and editing said demographic profile, transaction history and incentive indicia information of a personal memory store;

an output device capable of outputting said demographic profile, transaction history and incentive indicia information;

a microprocessor based control unit, coupled between the interface unit and the output device, the control unit managing information transfer and data processing under application software program control, the control unit including transaction circuitry for editing and updating transaction history data to reflect a customer's most recent transactions and for editing and updating current incentive indicia data to reflect a customer's most recent transactions, the transaction circuitry further for determining whether a particular customer's most recent transactions qualify that customer for an incentive award; and wherein, the updated transaction history data and updated current incentive indicia data processed by the transaction circuitry are written to the second and third data storage area portions of the personal memory store by the interface unit, thereby maintaining the transaction history and incentive indicia data stored in the data storage areas in an up-to-date condition reflecting the customer's most recent transactions.

2. The electronic personal shopping system according to claim 1, the point-of-sale terminal further comprising issue means for defining said first, second and at least third portions of a customer's personal memory store, issue means further including inputting means for entering demographic profile information specific to a customer to said first portion of a customer's personal memory store.

3. The electronic personal shopping system according to claim 1, wherein the personal memory store comprises a contact-type smart card.

4. The electronic personal shopping system according to claim 3, the contact-type smart card comprising a magnetic media defining the non-volatile data storage areas, the interface unit comprising a magnetic media reader/writer unit configured to interface with the card.

5. The electronic personal shopping system according to claim 3, the contact-type smart card further comprising:

at least a non-volatile integrated circuit memory element defining the non-volatile data storage areas;

a plurality of electrical contacts; and wherein, the interface unit is constructed to mate with said contact so as to read and write information from and to said memory element.

6. The electronic personal shopping system according to claim 1, wherein the personal memory store comprises a contactless-type smart card.

7. The electronic personal shopping system according to claim 6, the contactless-type smart card further comprising:

at least a non-volatile integrated circuit memory element defining the non-volatile data storage areas;

a transceiver circuit;

an integrated circuit processor for managing data information transfer between the memory element and the transceiver circuit; and wherein the interface unit is constructed to enter into wireless bi-directional communication with the transceiver circuit so as to read and write information from and to said memory element.

8. The electronic personal shopping system according to claim 7, wherein the contactless-type smart card is battery powered.

9. The electronic personal shopping system according to claim 7, wherein the contactless-type smart card is powered by radiative induction, the interface unit developing an induction field to power said card.

10. The electronic personal shopping system according to claim 1, the transaction circuitry comprising shopping history processing means for evaluating purchase item information of items being purchased and for providing transaction information to the interface unit for writing to the personal memory store.

11. The electronic personal shopping system according to claim 10, the transaction circuitry further comprising at least incentive point processing means for evaluating a price metric for items being purchased and for calculating incentive indicia on the basis of the price metric, the at least incentive point processing means further for providing the incentive indicia to the interface unit for writing to the personal memory store.

12. The electronic personal shopping system according to claim 1, wherein the customer specific demographic profile information comprises a data table, the data table including a customer identification entry, at least one merchandise brand preference entry, and at least one personal preference metric entry.

13. The electronic personal shopping system according to claim 12, wherein the at least one personal preference metric entry is at least one of a list including clothing size parameters, colors, patterns and style.

14. The electronic personal shopping system according to claim 1, wherein the transaction history information comprises a data table, the data table storing an item name and item price of each item purchased by a customer in one of a plurality of entries, thereby defining and maintaining a transaction record list, the list containing an entry for a customer's most recent transactions.

15. The electronic personal shopping system according to claim 14, wherein the transaction history information data table is cyclically maintained, such that when the table is completely filled with entries, the next entry is written over the oldest entry in the table.

16. An electronic personal shopping system for use in a retail facility, the system comprising:

a portable machine-readable personal memory store including a plurality of non-volatile data storage areas, the data storage areas partitioned to define a first portion containing customer specific demographic profile information, the personal memory store further partitioned to define a second portion containing information identifying a customer's transaction history and at least a third portion for storing a current incentive indicia, wherein the transaction history includes information on each item most recently purchased by the customer;

at least a customer assistance terminal, the assistance terminal including;

a personal memory store interface unit capable of reading said demographic profile, transaction history and incentive indicia information of said personal memory store;

an output device capable of displaying information in videographic or hardcopy form;

a microprocessor based control unit, coupled between the interface unit and the output device, the control unit managing information transfer and data processing under application software control, the control unit including transaction history processing means for analyzing a customer's transaction history information read from the personal memory store by the interface unit to thereby develop a customer assistance recommendation, the control unit further including demographic profile data processing means for analyzing a customer's demographic profile information read from the personal memory store by the interface unit to thereby personalize messages displayed or printed on the output device, the control unit further including incentive indicia processing means for analyzing a customer's current incentive indicia read from the personal memory store by the interface unit to thereby develop and display an incentive indicia status message.

17. The electronic personal shopping system according to claim 16, wherein the assistance recommendation developed by the transaction history processing means generates a co-ordinated item assessment in response to an analysis of recently purchased items defined by the customer's transaction history information.

18. The electronic personal shopping system according to claim 17, wherein the assistance recommendations developed by the transaction history processing means comprises promotional recommendations in response to an analysis of needed replenishment items determined from a customer's transaction history information.

19. The electronic personal shopping system according to claim 18, wherein the assistance recommendations developed by the transaction history processing means comprises promotional item recommendations in response to a determination that a customer's transaction history information lacks certain items falling within a predetermined criteria.

20. An electronic personal shopping system according to claim 16, wherein the demographic profile data processing means generates a personalized greeting message for display by the output device, the demographic profile data processing means further generating a promotional message in response to an analysis of at least a personal preference metric comprising a customer's demographic profile information.

21. The electronic personal shopping system according to claim 16, wherein the personal memory store comprises a contact-type smart card.

22. The electronic personal shopping system according to claim 21, the contact-type smart card comprising a magnetic media defining the non-volatile data storage areas, the interface unit comprising a magnetic media reader/writer unit configured to interface with the card.

23. The electronic personal shopping system according to claim 21, the contact-type smart card further comprising:

at least a non-volatile integrated circuit memory element defining the non-volatile data storage areas;

a plurality of electrical contacts; and wherein the interface unit is constructed to mate with said contacts so as to read and write information from and to said memory element.

24. The electronic personal shopping system according to claim 16, wherein the personal memory store comprises a contactless-type smart card.

25. The electronic personal shopping system according to claim 24, the contactless-type smart card further comprising:

at least a non-volatile integrated circuit memory element defining the non-volatile data storage areas;

a transceiver circuit;

an integrated circuit processor for managing data information transfer between the memory element and the transceiver circuit; and wherein the interface unit is constructed to enter into wireless bi-directional communication with the transceiver circuit so as to read and write information from and to said memory element.

26. The electronic personal shopping system according to claim 25, wherein the contactless-type smart card is battery powered.

27. The electronic personal shopping system according to claim 25, wherein the contactless-type smart card is powered by radiative induction, the interface unit developing an induction field power said card.

28. The electronic personal shopping system according to claim 16, wherein the customer specific demographic profile information comprises a data table, the data table including customer identification entry, at least one merchandise brand preference entry, and at least one personal preference metric entry.

29. The electronic personal shopping system according to claim 28, wherein the at least one personal preference metric entry is at least one of a list including clothing size parameters, colors, patterns and style.

30. The electronic personal shopping system according to claim 16, wherein the transaction history information comprises a data table, the data table storing an item name and item price of each item purchased by a customer in one of a plurality of entries, thereby defining and maintaining a transaction record list, the list containing an entry for a customer's most recent transactions.

31. A portable machine-readable personal memory store for interfacing with a customer assistance terminal, the personal memory store comprising:

a first data storage area including customer specific demographic profile information;

a second data storage area including real-time customer transaction information, the real-time customer transaction information including an item name and item price of each item most recently purchased by the customer; and a third data storage area including incentive indicia information;

wherein, the customer specific demographic profile information in the first data storage area and the real-time customer transaction information in the second data storage area are used by the customer assistance terminal for recommending promotional items that the customer might be interested in, and the incentive indicia information is updated to reflect the customer's most recent transactions.

32. A customer assistance terminal for interfacing with a portable machine-readable personal memory store, the personal memory store having a first data storage area with customer specific demographic profile information, a second data storage area with real-time customer transaction information, the real-time customer transaction information including an item name and item price of each item most recently purchased by the customer, and a third data storage area with incentive indicia information, the customer assistance terminal comprising:

a personal memory store interface unit capable of reading said demographic profile, transaction history and incentive indicia information of said personal memory store;

an output device capable of displaying information in videographic or hardcopy form;

a microprocessor based control unit, coupled between the interface unit and the output device, the control unit managing information transfer and data processing under application software control, the control unit including transaction information processing means and a demographic profile information processing means for analyzing the real-time customer transaction information and demographic profile information read from the personal memory store to thereby develop recommendations of promotional items that the customer might be interested in, the control unit further including incentive indicia processing means for analyzing the customer's incentive indicia information read from the personal memory store to develop and display an incentive indicia status message.

* * * * *

UNITED STATES PATENT AND TRADEMARK OFFICE
CERTIFICATE OF CORRECTION

PATENT NO.   : 6,129,274
DATED        : October 10, 2000
INVENTOR(S)  : Hikaru Suzuki It is certified that error appears in the above-identified patent and that said Letters Patent is hereby corrected as shown below:

Column 4,
Line 27, delete "are" and insert therefor -- area --.

Column 5,
Line 13, delete "co-ordinated" and insert therefor -- coordinated --.

Column 11,
Line 5, delete "recirculating" and insert therefor -- recirculating --.

Column 17,
Line 27, delete "co-ordinated" and insert therefor -- coordinated --.

Column 18,
Line 19, after "field" insert -- to --.

Signed and Sealed this

Fourth Day of June, 2002

*Attest:*

*Attesting Officer*

JAMES E. ROGAN
*Director of the United States Patent and Trademark Office*